US012629643B2

(12) United States Patent
Patil S et al.

(10) Patent No.: US 12,629,643 B2
(45) Date of Patent: May 19, 2026

(54) RECURSIVE FLOW GAS MIXER

(71) Applicant: Applied Materials, Inc., Santa Clara, CA (US)

(72) Inventors: Shreyas Patil S, Bangalore (IN); Sandesh Y D, Bangalore (IN); Manjunatha P. Koppa, Bengaluru (IN)

(73) Assignee: Applied Materials Inc., Santa Clara, CA (US)

( * ) Notice: Subject to any disclaimer, the term of this patent is extended or adjusted under 35 U.S.C. 154(b) by 450 days.

(21) Appl. No.: 18/195,755

(22) Filed: May 10, 2023

(65) Prior Publication Data

US 2024/0375066 A1 Nov. 14, 2024

(51) Int. Cl.

*B01F 25/314* (2022.01)
*B01F 23/10* (2022.01)
*B01F 35/221* (2022.01)
*B01F 101/58* (2022.01)

(52) U.S. Cl.

CPC .......... *B01F 25/3142* (2022.01); *B01F 23/10* (2022.01); *B01F 25/31423* (2022.01); *B01F 25/31424* (2022.01); *B01F 35/2211* (2022.01); *B01F 2101/58* (2022.01)

(58) Field of Classification Search

CPC .................. B01F 23/10; B01F 25/3142; B01F 25/31423; B01F 25/31424; B01F 2101/58

See application file for complete search history.

(56) References Cited

U.S. PATENT DOCUMENTS

| | | | | |
|---|---|---|---|---|
| 5,131,757 | A * | 7/1992 | Smith | B01F 25/31423 261/118 |
| 6,068,703 | A | 5/2000 | Chen et al. | |
| 8,042,988 | B2 * | 10/2011 | Ding | B01F 25/31423 366/173.2 |
| 10,058,828 | B2 * | 8/2018 | Jiskoot | G01N 1/38 |
| 10,266,945 | B2 * | 4/2019 | Yamashita | B01F 25/104 |
| 10,610,838 | B2 * | 4/2020 | Tang | B01F 25/3141 |
| 10,903,054 | B2 | 1/2021 | Singh et al. | |
| 11,198,939 | B2 | 12/2021 | Miller et al. | |

(Continued)

FOREIGN PATENT DOCUMENTS

KR 10-2026965 B1 9/2019

OTHER PUBLICATIONS

PCT International Search Report and Written Opinion for PCT/US2024/028114 dated Aug. 27, 2024.

*Primary Examiner* — Kevin F Murphy
(74) *Attorney, Agent, or Firm* — Moser Taboada

(57) ABSTRACT

Methods and apparatus for gas mixing are provided. In some embodiments, a gas mixing apparatus includes: a tubular body having a wall extending longitudinally from a first end to a second end and having an outer side and an inner side that surrounds a central through opening and defining a first flow path between the first end and the second end; one or more inlet holes formed in the outer side of the wall; a plurality of exit holes formed in the inner side of the wall and communicating with the central through opening; and a plurality of longitudinal channels formed within the wall fluidly coupled to the one or more inlet holes and the plurality of exit holes, wherein the one or more inlet holes, the plurality of exit holes, and the plurality of longitudinal channels define a recursive second flow path that intersects with the first flow path.

17 Claims, 4 Drawing Sheets

(56) References Cited

U.S. PATENT DOCUMENTS

| | | | | |
|---|---|---|---|---|
| 11,673,104 | B2 * | 6/2023 | Sabey | B01F 25/31241 137/3 |
| 2005/0133457 | A1 | 6/2005 | Tonkovich et al. | |
| 2007/0019503 | A1 | 1/2007 | Kingsford | |
| 2014/0269156 | A1 | 9/2014 | Lane et al. | |
| 2018/0330951 | A1 | 11/2018 | Kulshreshtha et al. | |
| 2021/0199299 | A1 | 7/2021 | Berry et al. | |
| 2022/0130687 | A1 | 4/2022 | Rajeev et al. | |

* cited by examiner

RECURSIVE FLOW GAS MIXER

FIELD

Embodiments of the present disclosure generally relate to gas mixing, and more particularly, gas mixing a plurality of gases for substrate processing, such as for chemical vapor deposition (CVD) or atomic layer deposition (ALD) processes.

BACKGROUND

In semiconductor processing equipment, multiple gas species are often input into a common manifold before being introduced to a process chamber through a showerhead. A homogeneous mixture of the gas species may be useful to achieve deposition film uniformity and substrate process repeatability. However, the inventors have observed that some gas mixers do not produce a homogeneous mixture of the gas species, and thereby cause non-uniformities in deposition profiles on substrates.

Therefore, the inventors propose a gas mixer that produces a homogeneous mixture of gas species to reduce or eliminate non-uniformities in deposition profiles on substrates.

SUMMARY

Methods, systems, and apparatus for gas mixing are provided herein. In some embodiments, a gas mixing apparatus includes a tubular body having a wall extending longitudinally from a first end to a second end and having an outer side and an inner side, the inner side surrounding a central through opening and defining a first flow path between the first end and the second end; one or more inlet holes formed in the outer side of the wall; a plurality of exit holes formed in the inner side of the wall and communicating with the central through opening; and a plurality of longitudinal channels formed within the wall fluidly coupled to the one or more inlet holes and the plurality of exit holes, wherein the one or more inlet holes, the plurality of exit holes, and the plurality of longitudinal channels define a recursive second flow path that intersects with the first flow path in the central through opening.

In some embodiments, a gas mixing system includes: a gas mixer including: a tubular body having a wall extending longitudinally from a first end to a second end and having an outer side and an inner side, the inner side surrounding a central through opening and defining a first flow path between the first end and the second end; one or more inlet holes formed in the outer side of the wall; a plurality of exit holes formed in the inner side of the wall and communicating with the central through opening; and a plurality of longitudinal channels formed within the wall fluidly coupled to the one or more inlet holes and the plurality of exit holes, wherein the one or more inlet holes, the plurality of exit holes, and the plurality of longitudinal channels define a recursive second flow path that intersects with the first flow path in the central through opening; a first gas supply coupled to the central through opening at the first end; and a second gas supply coupled to the one or more inlet holes.

In some embodiments, a method of gas mixing includes: introducing a first gas through a central through opening of a tubular body having a wall extending longitudinally from a first end to a second end and having an outer side and an inner side, the inner side surrounding the central through opening; introducing a second gas through one or more inlet holes formed in the outer side of the wall, wherein the introduced second gas flows through a plurality of longitudinal channels formed within the wall to a plurality of exit holes formed in the inner side of the wall and exits the plurality of exit holes into the central through opening and mixes with the first gas; and transporting the mixed first and second gases through the central through opening to the second end.

Other and further embodiments of the present disclosure are described below.

BRIEF DESCRIPTION OF THE DRAWINGS

Embodiments of the present disclosure, briefly summarized above and discussed in greater detail below, can be understood by reference to the illustrative embodiments of the disclosure depicted in the appended drawings. However, the appended drawings illustrate only typical embodiments of the disclosure and are therefore not to be considered limiting of scope, for the disclosure may admit to other equally effective embodiments.

Figure 1:
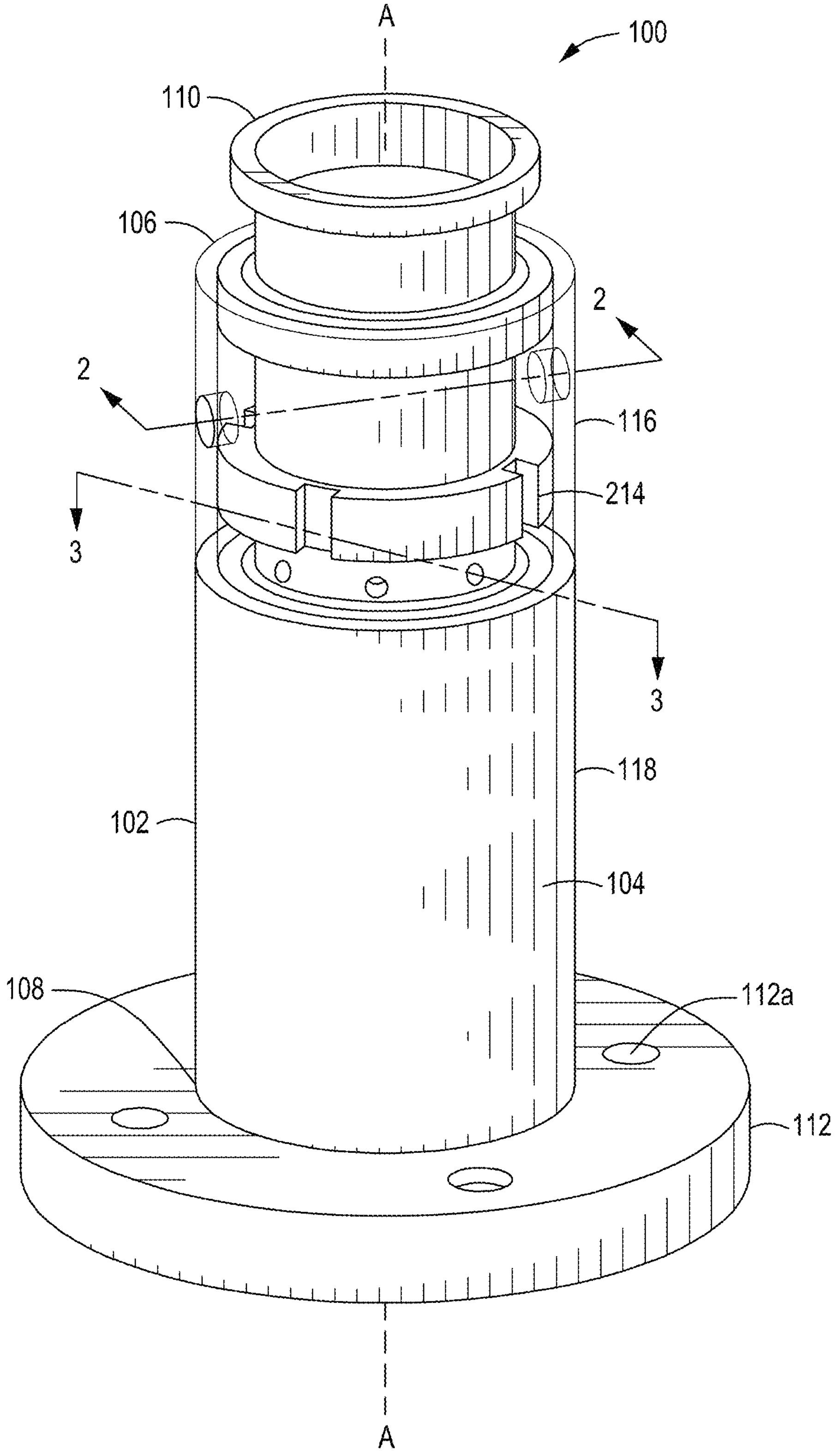
FIG. 1 is an isometric view of a gas mixer in accordance with embodiments of the present disclosure.

To facilitate understanding, identical reference numerals have been used, where possible, to designate identical elements that are common to the figures. The figures are not drawn to scale and may be simplified for clarity. Elements and features of one embodiment may be beneficially incorporated in other embodiments without further recitation.

DETAILED DESCRIPTION

Embodiments of a gas mixer apparatus, system, and method are provided herein. The gas mixer defines a plurality of gas flow paths that intersect within the gas mixer. In some embodiments, one of the gas flow paths is recursive and another gas flow path extends centrally through the gas mixer. The recursive gas flow path facilitates symmetrical mixing of gases flowing through the plurality of gas flow paths. During operation, while a first gas flows through the recursive gas flow path and mixes with a second gas flowing through the central gas flow path, the gases mix homogeneously within the gas mixer. Such homogeneously mixed gases can improve the symmetry of a deposited film pattern on a substrate during substrate processing, for example during chemical vapor deposition (CVD) or atomic layer deposition (ALD) processing. The disclosed gas mixer apparatus can also advantageously be used in processing systems other than those configured for CVD or ALD, such as any substrate processing system where multiple gases are mixed prior to introduction into a processing chamber.

FIG. 1 is an isometric view of a gas mixer 100 in accordance with embodiments of the present disclosure. The gas mixer 100 includes a tubular body 102 having a wall 104 extending longitudinally along an axis A-A from a first end 106 to a second end 108. The first end 106 may have an inlet port 110 configured to receive a first gas. The second end 108 may have a flange 112 with holes **112*a* for receiving fasteners, such as bolts, for fixing the gas mixer 100 to a manifold or other inlet of a CVD or ALD chamber, as discussed in greater detail below. In some embodiments, the gas mixer 100 may be formed as a unitary structure. In some embodiments, the gas mixer 100 may consist of a single piece of metal, such as aluminum (AL 6061), which may be formed by 3D printing. In some embodiments, the gas mixer 100 may be formed of a plurality of pieces assembled together from various materials, such as metal (e.g., aluminum) or ceramic. For example, the gas mixer 100 may include a first portion 116 (shown as a transparent sleeve in FIG. 1) and a second portion 118. In some embodiments, the first portion 116 and the second portion 118** may be made as separate pieces and assembled together. In some embodiments, the separate pieces may be made by 3D printing or by conventional manufacturing methods.

Figure 2:
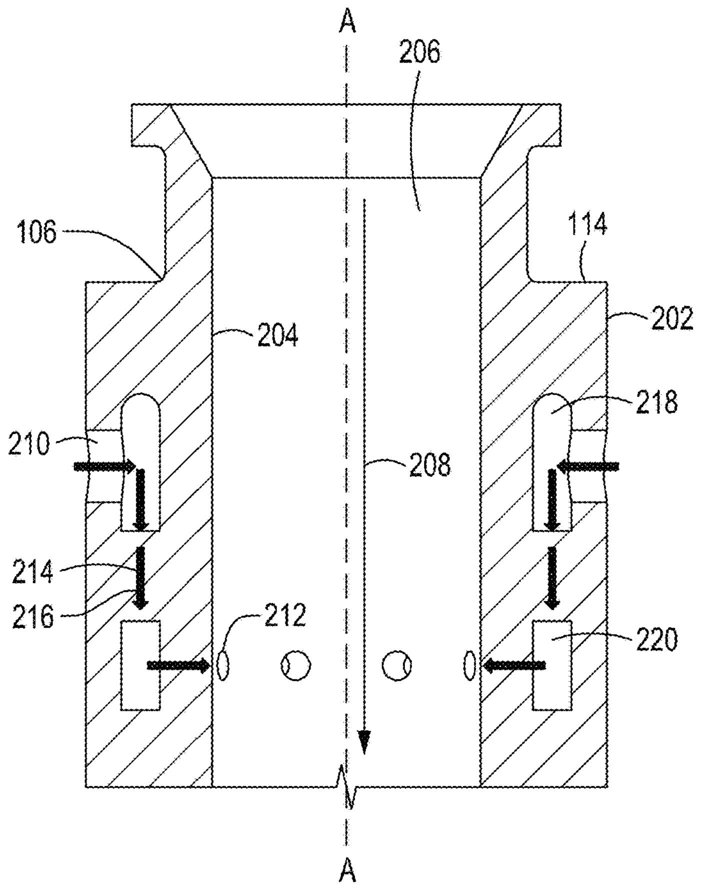
FIG. 2 shows the gas mixer of FIG. 1 along section line 2-2 in FIG. 1.

In some embodiments, and as shown more clearly in FIG. 2, the wall 104 may have an outer side 202 and an inner side 204 that surrounds a central through opening 206 and defines a first flow path 208 between the first end 106 and the second end 108. In some embodiments, and as shown in FIG. 2, one or more inlet holes 210 (two are shown) may be formed in the outer side 202 of the wall 114 and a plurality of exit holes 212 (eight are shown) may be formed in the inner side 204 of the wall 114 and communicate with the central through opening 206. In some embodiments, the number of exit holes 212 of the plurality of exit holes 212 may be more than the number of inlet holes 210. In some embodiments, and as shown in FIG. 2, the one or more inlet holes 210 are spaced longitudinally from the plurality of exit holes 212. In some embodiments, and as shown in FIG. 2, the one ore more inlet holes 210 and the plurality of exit holes 212 may extend radially with respect to axis A-A. However, in some embodiments, at least some inlet holes 210 or exit holes 212 may extend at any angle. In some embodiments, and as shown in FIG. 2, a plurality of longitudinal channels 214 (four channels are shown) may be formed within the wall 114 that are fluidly coupled to the one or more inlet holes 210 and the plurality of exit holes 212.

In some embodiments, and as shown in FIG. 2, the gas mixer 100 may include a first annular channel 218 formed within the wall 114 coupled to the one or more inlet holes 210, and a second annular channel 220 formed within the wall 114 coupled to the plurality of exit holes 212. The plurality of longitudinal channels 214 may extend between the first annular channel 218 and the second annular channel 220. In some embodiments, and as shown in FIG. 2, the first annular channel 218 may radially or otherwise horizontally align with the one or more inlet holes 210 and the second annular channel 220 may radially or otherwise horizontally align with the plurality of exit holes 212. The first annular channel 218 may function to receive gas entering the wall 114 through the one or more inlet holes 210 and uniformly distribute the received gas to the plurality of longitudinal channels 214. The second annular channel 220 may function to receive gas from the longitudinal channels 214 and uniformly distribute the received gas to the plurality of exit holes 212. In some embodiments, more than two annular channels may be provided to provide additional gas flow splitting within the wall 114.

In some embodiments, and as shown in FIG. 2, two or more inlet holes 210 may be circumferentially spaced equidistantly (e.g., 180 degrees with respect to axis A-A) from one another, the plurality of exit holes 212 may be circumferentially spaced equidistantly from one another (e.g., 45 degrees with respect to axis A-A), and the plurality of longitudinal channels 214 may be circumferentially spaced equidistantly from one another (e.g., 90 degrees with respect to axis A-A). The equal spacing of 2 or more inlet holes 210, the plurality of exit holes 212, or the plurality of longitudinal channels 214 may facilitate homogeneous mixing of the first gas and the second gas in the central through opening 206.

Figure 3:
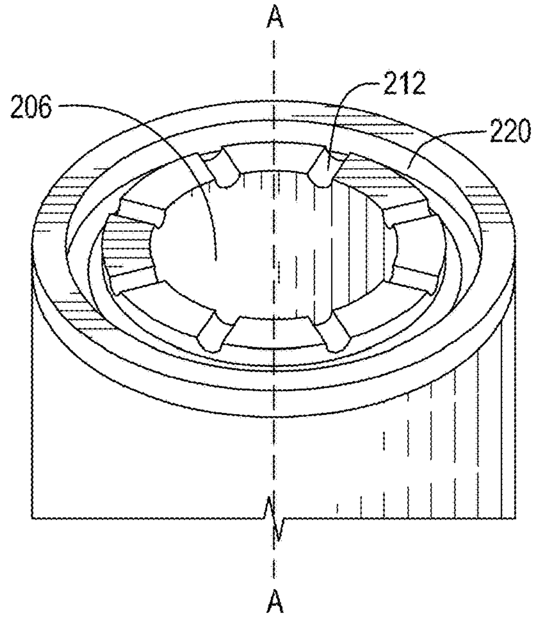
FIG. 3 shows the gas mixer of FIG. 1 along section line 3-3 in FIG. 1.

Also, in some embodiments, and as shown in FIGS. 2 and 3, the longitudinal channels 214 and the inlet holes 210 include two or more inlet holes 210 that are all equidistantly circumferentially spaced. In FIGS. 2 and 3 two inlet holes 210 are shown that are diametrically opposed from one another, and the longitudinal channels 214 are positioned circumferentially relative to inlet holes 210 so that there is equal distance from each inlet hole 210 to each adjacent longitudinal channel 214. Similarly, in some embodiments, and as shown in FIGS. 2 and 3, four longitudinal channels 214 and eight exit holes 212 are all equidistantly circumferentially spaced and the eight exit holes 212 are circumferentially spaced equidistant from adjacent longitudinal channels 214. The relative dimensions of the one or more inlet holes 210, the plurality of exit holes 212, the plurality of longitudinal channels 214, the first annular channel 218, and the second annular channel 220 may vary depending on various factors, including the composition of the first and second gases to be mixed, and operating conditions such as pressure and temperature.

In some embodiments, the one or more inlet holes 210 are configured to receive a second gas and direct the second gas into the first annular channel 218. The first annular channel 218 may be configured to receive the second gas and distribute the second gas to the plurality of longitudinal channels 214, which are connected to the first annular channel 218. The plurality of longitudinal channels 214 may be connected to the second annular channel 220 and may feed the second gas to the second annular channel 220. The second annular channel 220 may be configured to receive the second gas from the plurality of longitudinal channels 214 and distribute the second gas to the plurality of exit holes 212, which may be configured to direct the second gas into the central through opening 206. The plurality of exit holes 212 may discharge the second gas with a uniform pressure in a symmetric manner, which may facilitate mixing the second gas with a first gas flowing in the central through opening 206.

As shown in FIG. 2, the one or more inlet holes 210, the plurality of exit holes 212, and the plurality of longitudinal channels 214 may at least partially define a recursive second flow path 216, which intersects with the first flow path 208 in the central through opening 206. The first annular channel 218 and the second annular channel 220 may also partially define the second flow path 216. Thus, in some embodiments, a second gas may enter the wall 114 through the one or more inlet holes 210, spread around the first annular channel 218, flow longitudinally through longitudinal channels 214, spread around the second annular channel 220, and exit the wall 114 through the plurality of exit holes 212 to mix with a first gas flowing along the first flow path 208. The second flow path 216 is recursive by splitting the flow of second gas within the wall 114 at least two longitudinally spaced locations of the wall 114, such as the one or more inlet holes 210, the longitudinal channels 214, and the plurality of exit holes 212. For example, in some embodiments, and as shown in FIG. 2, two inlet holes 210 feed the first annular channel 218 that feeds four longitudinal channels 214, which feed the second annular channel 220, which in turn feeds eight exit holes 212. The recursive second flow path 216 may reduce the pressure of the second gas and improve flow uniformity of the second gas being discharged from the plurality of exit holes 212 into the central through opening 206 to improve gas mixing with a first gas flowing in the central through opening 206.

Thus, when a first gas flows along the first flow path 208 and a second gas flows along the second flow path 216, the first gas and the second gas can mix in the central through opening 206 between the first end 106 and the second end 108. The second gas may be distributed at a uniform pressure from the plurality of exit holes 212 in a symmetric manner to promote more uniform mixing with the first gas. Moreover, due in part to the recursive flow of the second flow path 216, the second gas may enter the central through opening 206 at a relatively low pressure to facilitate more uniform mixing with the first gas.

In some embodiments, there are increasing numbers of holes and channels along the second flow path 216. In the embodiments shown in FIG. 2, the one or more inlet holes 210 includes two inlet holes 210, the plurality of longitudinal channels 214, and the plurality of exit holes 212 includes 8 holes. Also, to maintain even gas flow of the second gas, at least one of the first annular channel 218 or the second annular channel 220 may be larger or have greater flow conductance than the one or more inlet holes 210, the plurality of exit holes 212, or the plurality of longitudinal channels 214. Thus, in some embodiments, second gas flowing from two inlet holes 210 will distribute and flow relatively evenly through four longitudinal channels 214 of the plurality of longitudinal channels 214, which cause the second gas to fill the second annular channel 220 with even pressure such that the second gas flows out of the eight exit holes 212 of the plurality of exit holes 212 with more uniform pressure. This means that the volume of second gas and flow velocity of the second gas is about equal so the amount of second gas and its distribution within the central through opening 206 is more even, resulting in more uniform mixing between the first gas and the second gas.

Figure 4:
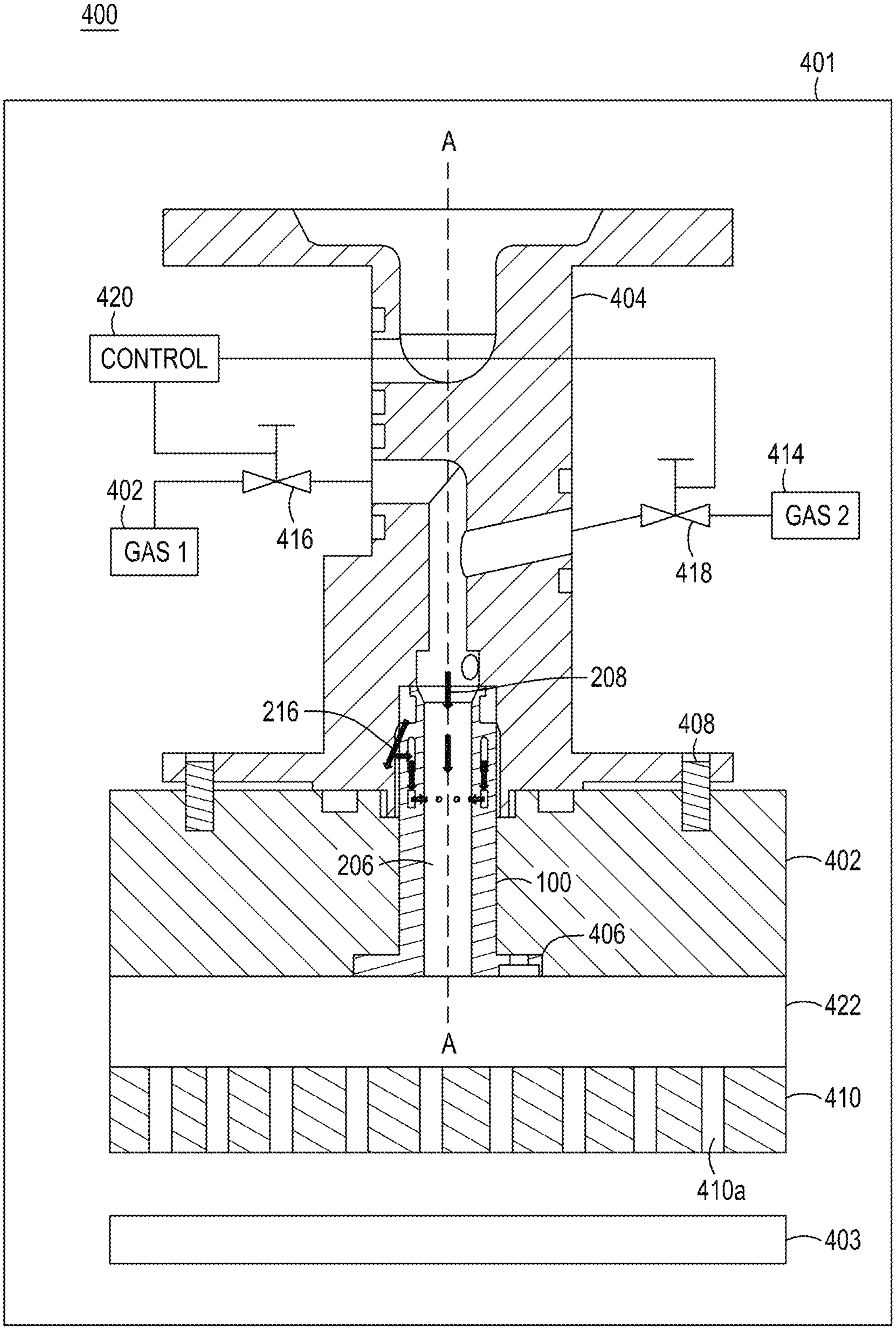
FIG. 4 is a schematic side section view of a gas mixing system in a process chamber in accordance with embodiments of the present disclosure.

FIG. 4 is a schematic side section view of a gas mixing system 400 in a process chamber 401 in accordance with embodiments of the present disclosure. In some embodiments, the process chamber 401 may be a CVD or ALD process chamber configured for CVD or ALD processing of a substrate 403. In some embodiments, the gas mixing system 400 may include a gas mixer, such as gas mixer 100, a plate 402 to which the gas mixer 100 is mounted, and a gas distribution manifold 404 fixed to the plate 402 and fluidly coupled to the gas mixer 100. In some embodiments, and as shown in FIG. 4, the flange 112 of the gas mixer is received in a recess 406 of the plate 402 and may be secured to the plate 402 with fasteners (not shown), such as bolts, through the holes 112*a* in the flange 112. The gas distribution manifold 404 may be fixed to the plate 402 with fasteners 408. The plate 402 is spaced from a gas distribution plate 410 having holes 410*a* configured to distribute gas mixtures onto substrate 403. In some embodiments, and as shown in FIG. 4, a plenum 422 may be disposed between the plate 402 and the gas distribution plate 410. The gas mixer 100 provides mixed gas into the plenum 422, from where it is distributed into the processing volume of the process chamber 401 and ultimately to the substrate 403.

In some embodiments, the gas mixing system 400 includes a first gas supply 412 and second gas supply 414 coupled to the gas distribution manifold 404. The gas distribution manifold may route a first gas from the first gas supply 412 to the central through opening 206 and may route a second gas from the second gas supply 414 to the one or more inlet holes 210. In some embodiments, the gas mixing system 400 may include a first flow control valve 416 and a second flow control valve 418 and a controller 420 connected to at least one of the first gas supply 412, the second gas supply 414, the first flow control valve 416, or the second flow control valve 418. In some embodiments, at least one of the first gas or the second gas includes a gas compatible with a CVD or ALD process. In some embodiments, the controller 420 is configured to control a flow of a first gas along the first flow path 208 and to control a flow of a second gas along the second flow path 216. In some embodiments, the controller 420 may control the operation of the first flow control valve 416 to flow the first gas along the first flow path 208 and the second flow control valve 418 to flow the second gas along the second flow path 216.

Figure 5:
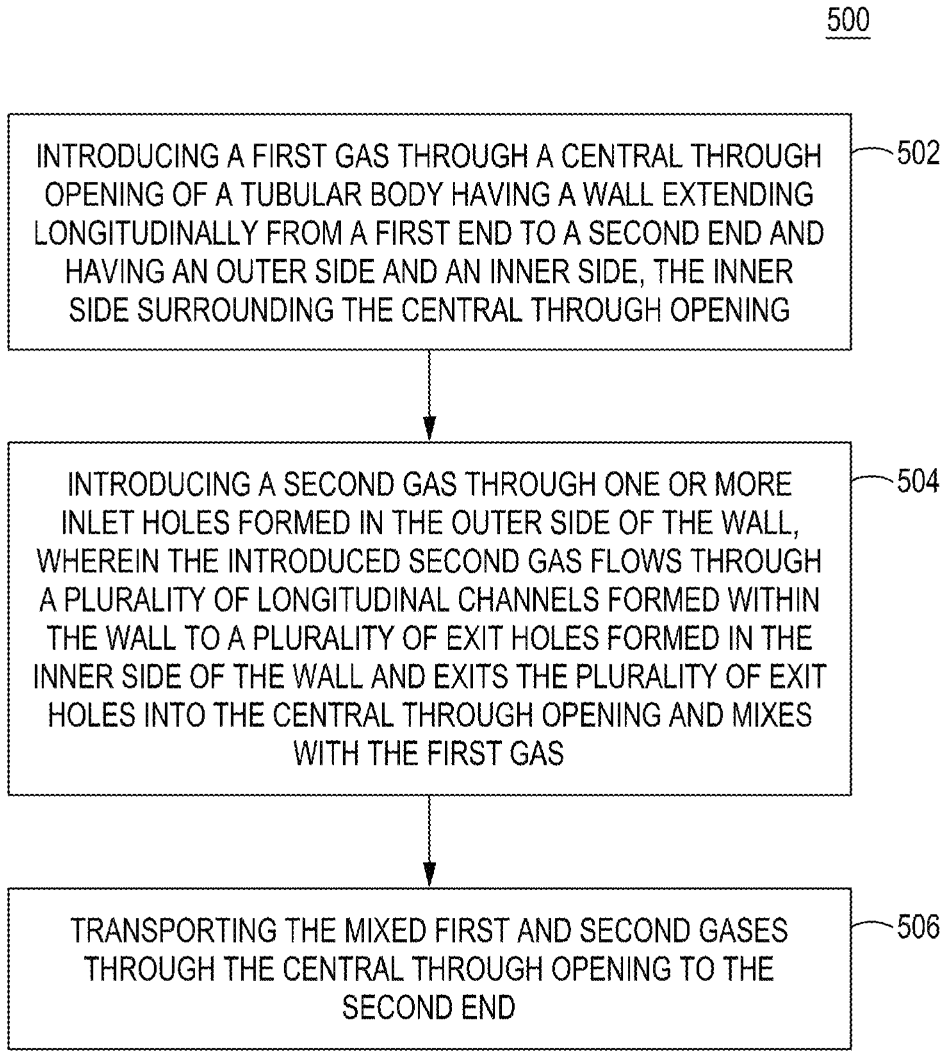
FIG. 5 shows a method of mixing gases in accordance with embodiments of the present disclosure.

FIG. 5 shows a method 500 of mixing gases in accordance with embodiments of the present disclosure. The method 500 may be described with reference to the gas mixing system 400 shown in FIG. 4. At block 502, a first gas is introduced through the central through opening 206 of the tubular body 102. The first gas may be introduced through the central through opening 206 at the first end 106 by having the controller 420 open the first flow control valve 416 to permit the first gas to enter the central through opening 206. At block 504, the second gas may be introduced through the one or more inlet holes 210. The second gas may be introduced by having the controller 420 open the second flow control valve 418 to permit the second gas to enter the one or more inlet holes 210. The introduced second gas may then flow through the plurality of longitudinal channels 214 to the plurality of exit holes 212, where the second gas can flow into the central through opening 206 to mix with the first gas. At block 506, the mixed first gas and second gas are transported through the central through opening 206 to the second end 108. In some embodiments, the introduced second gas enters the first annular channel 218 formed within the wall 114 before entering the plurality of longitudinal channels 214 and enters the second annular channel 220 formed within the wall 114 before exiting the plurality of exit holes 212. In some embodiments, the first gas and the second gas are uniformly mixed at or before reaching the second end 108.

The first flow path 208 and the second flow path 216 intersect within the central through opening 206 to homogenously mix the first gas and the second gas in the central through opening 206. By homogenously mixing the first and second gases before reaching the gas distribution plate 410, the deposition of gas species on the substrate processed in the chamber may be made more uniform.

While the foregoing is directed to embodiments of the present disclosure, other and further embodiments of the disclosure may be devised without departing from the basic scope thereof.

The invention claimed is:

1. A gas mixing apparatus, comprising:

a tubular body having a wall extending longitudinally from a first end to a second end and having an outer side and an inner side, the inner side surrounding a central through opening and defining a first flow path between the first end and the second end;

one or more inlet holes formed in the outer side of the wall;

a plurality of exit holes formed in the inner side of the wall and communicating with the central through opening;

a plurality of longitudinal channels formed within the wall fluidly coupled to the one or more inlet holes and the plurality of exit holes, wherein the one or more inlet holes, the plurality of exit holes, and the plurality of longitudinal channels define a recursive second flow path that intersects with the first flow path in the central through opening;

a first annular channel formed within the wall coupled to the one or more inlet holes; and a second annular channel formed within the wall coupled to the plurality of exit holes, wherein the plurality of longitudinal channels extend between the first annular channel and the second annular channel.

2. The apparatus of claim 1, wherein the one or more inlet holes include 2 holes, the plurality of exit holes includes 8 holes, and the plurality of longitudinal channels includes 4 longitudinal channels.

3. The apparatus of claim 1, wherein the one or more inlet holes include at least two inlet holes circumferentially spaced equidistantly from one another, the plurality of exit holes are circumferentially spaced equidistantly from one another, and the plurality of longitudinal channels are circumferentially spaced equidistantly from one another.

4. The apparatus of claim 1, wherein the tubular body is formed as a unitary structure.

5. The apparatus of claim 4, wherein the tubular body consists of a single piece of metal.

6. A gas mixing system, comprising:

a gas mixer including:

a tubular body having a wall extending longitudinally from a first end to a second end and having an outer side and an inner side, the inner side surrounding a central through opening and defining a first flow path between the first end and the second end;

one or more inlet holes formed in the outer side of the wall;

a plurality of exit holes formed in the inner side of the wall and communicating with the central through opening; and a plurality of longitudinal channels formed within the wall fluidly coupled to the one or more inlet holes and the plurality of exit holes, wherein the one or more inlet holes, the plurality of exit holes, and the plurality of longitudinal channels define a recursive second flow path that intersects with the first flow path in the central through opening;

a first annular channel formed within the wall coupled to the one or more inlet holes; and a second annular channel formed within the wall coupled to the plurality of exit holes, wherein the plurality of longitudinal channels extend between the first annular channel and the second annular channel;

a first gas supply coupled to the central through opening at the first end; and a second gas supply coupled to the one or more inlet holes.

7. The system of claim 6, further comprising an inlet port at the first end and coupled to the first gas supply.

8. The system of claim 6, further comprising a gas distribution plate spaced from the second end.

9. The system of claim 6, wherein the one or more inlet holes include 2 holes, the plurality of exit holes includes 8 holes, and the plurality of longitudinal channels includes 4 longitudinal channels.

10. The system of claim 6, wherein the one or more inlet holes include at least 2 inlet holes that are circumferentially spaced equidistantly from one another, the plurality of exit holes are circumferentially spaced equidistantly from one another, and the plurality of longitudinal channels are circumferentially spaced equidistantly from one another.

11. The system of claim 6, wherein the tubular body is formed as a unitary structure.

12. The system of claim 6, further comprising a controller connected to the first gas supply and the second gas supply, the controller configured to control a flow of a first gas along the first flow path and to control a flow of a second gas along the second flow path.

13. A method of gas mixing, comprising:

introducing a first gas through a central through opening of a tubular body having a wall extending longitudinally from a first end to a second end and having an outer side and an inner side, the inner side surrounding the central through opening;

introducing a second gas through one or more inlet holes formed in the outer side of the wall, wherein the introduced second gas flows through a plurality of longitudinal channels formed within the wall to a plurality of exit holes formed in the inner side of the wall and exits the plurality of exit holes into the central through opening and mixes with the first gas; and transporting the mixed first and second gases through the central through opening to the second end, wherein the introduced second gas enters a first annular channel formed within the wall before entering the plurality of longitudinal channels and enters a second annular channel formed within the wall before exiting the plurality of exit holes.

14. The method of claim 13, wherein the first gas is introduced through the central through opening at the first end.

15. The method of claim 13, wherein the one or more inlet holes include at least 2 inlet holes that are circumferentially spaced equidistantly from one another, the plurality of exit holes are circumferentially spaced equidistantly from one another, and the plurality of longitudinal channels are circumferentially spaced equidistantly from one another.

16. The method of claim 13, wherein at least one of the first gas or the second gas is compatible with a CVD or ALD process.

17. The method of claim 13, wherein the first gas and the second gas are uniformly mixed at the second end.

* * * * *